No. 844,091. PATENTED FEB. 12, 1907.
W. BORCHERT.
DRILL CHUCK.
APPLICATION FILED NOV. 26, 1906.
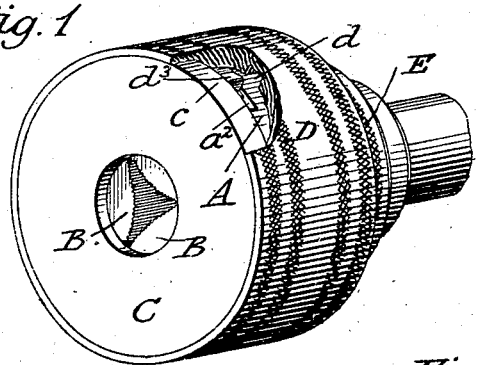
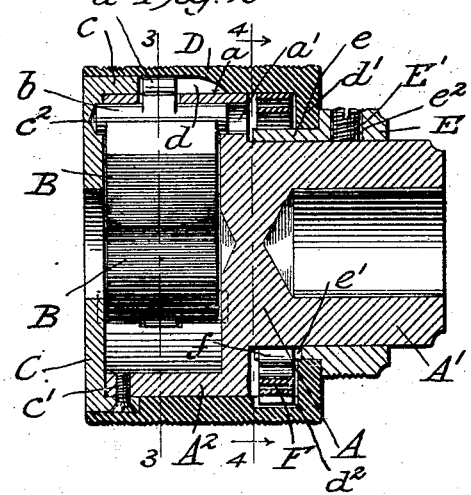
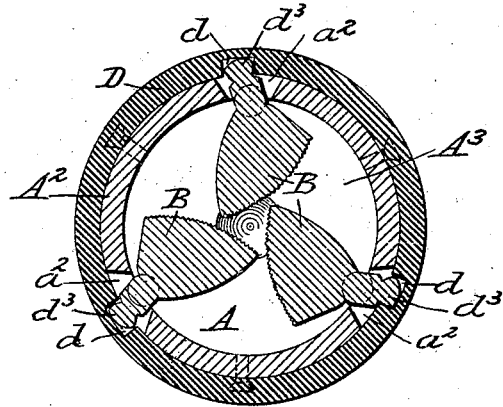
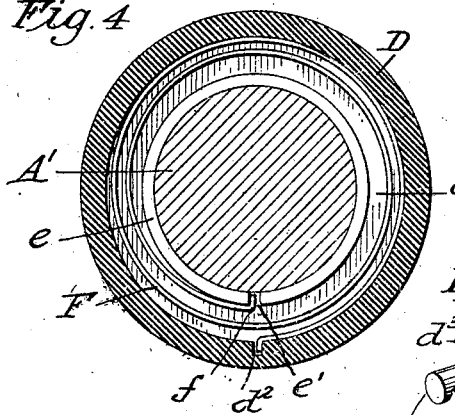
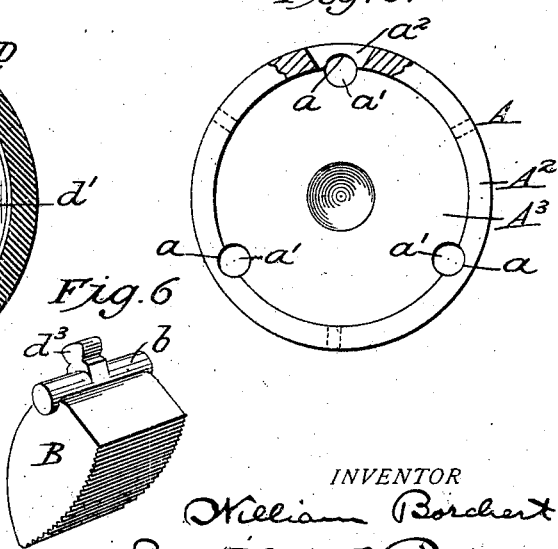
WITNESSES
INVENTOR
William Borchert
By Chas. E. Gordon
Attorney
THE NORRIS PETERS CO., WASHINGTON, D. C.

UNITED STATES PATENT OFFICE.

WILLIAM BORCHERT, OF RENO, NEVADA, ASSIGNOR OF ONE-HALF TO RICHARD KIRMAN, OF RENO, NEVADA.

DRILL-CHUCK.

No. 844,091.　　　Specification of Letters Patent.　　　Patented Feb. 12, 1907.

Application filed November 26, 1906. Serial No. 345,149.

*To all whom it may concern:*

Be it known that I, WILLIAM BORCHERT, a citizen of the United States, residing at Reno, in the county of Washoe and State of Nevada, have invented certain new and useful Improvements in Drill-Chucks, of which the following is a full, clear, and exact specification.

This invention relates to that class of machine or drill chucks embodying a body wherein are pivoted a plurality of cam-faced gripping-jaws having outwardly-extending lugs which are engaged by a sleeve or casing embracing the body and rotating independently thereof to move the gripping-jaws on their pivots and a volute spring secured at one end to the body to which or in which the gripping-jaws are pivoted and at the other end engaging a movable ring, plate, or other device through which the spring-pressure may be exerted on the jaws to hold them in a position to grasp the smallest tool-shank that may be used with a particular chuck.

The main object of my invention is a chuck of the type named so constructed that the tension of the spring actuating the jaws may be changed in wide limits to more perfectly adapt a single chuck to drill-shanks of different sizes.

A further object of the invention is a chuck of the type named devoid of exterior projections or recesses, thus facilitating the removal and replacement of tools or other objects while the chuck is revolving at high speed.

With these and other objects in view my invention consists in the construction and arrangement of parts and combinations, which will be first described in detail and then set up in the claims at the close of this specification.

In the accompanying drawings, Figure 1 is a perspective view, partly broken away to expose coacting parts, of a chuck embodying my invention. Fig. 2 is an axial section through the same. Fig. 3 is a section on line 3 3, Fig. 2. Fig. 4 is a section on line 4 4, Fig. 2, looking in the direction of the arrow. Fig. 5 is a front elevation, partly in section, of the chuck-body. Fig. 6 is a detail perspective, on a larger scale, of one of the gripping-jaws.

The device illustrated in the drawings is designed as a chuck to grasp the shank of a drill or other tool, and in this relation the bottom of the tool-cavity of the chuck-body affords an abutment to sustain the thrust of a tool; but it will be understood that my invention applies as well to a hollow chuck for handling long rods, bars, or pipes, and the ensuing specification should be read with this feature in view.

The chuck-body A comprises an integral body of metal machined to form a cylindric shank A', adapted for attachment to a lathe spindle and head $A^2$, the latter being drilled or reamed to form a cylindric tool-cavity $A^3$, truly concentric with the axis of the body. The wall of the tool-cavity is provided with three semicircular grooves $a$ spaced apart symmetrically, said grooves terminating at their inner ends in bearing-apertures $a'$, formed in the chuck-body, and the head $A^2$ is pierced about midway of its length with apertures $a^2$, intersecting said grooves and having outwardly-diverging walls, all as best shown in Figs. 3 and 5.

Gripping-jaws B (shown in detail in Fig. 6) formed of cast-steel blocks of a length nearly equal to that of the tool-cavity of the head and formed with journals $b$, which have bearing throughout their length in the grooves $a$ of the tool-cavity of the chuck-head. These journals extend beyond the body of the jaws, the ends finding bearing at one end in the apertures $a'$ and at the other end in a face-plate, presently to be described.

The face-plate C is an annular plate having a flange $c$, which extends over and is secured to the head of the chuck-body A by screws $c'$, three being shown in the drawings solely for purposes of illustration, as in practice but two are used at diametrically opposite points.

The sleeve or casing D is sleeved upon the head $A^2$ of the chuck-body by a "sliding fit"—*i. e.*, it fits snugly upon the head while permitted rotary movement with relation thereto—and is provided with grooves or channels $d$ to engage the "doll-head-shaped" lugs $d^3$ extending beyond the journals of the gripping-jaws. The sleeve or casing D has at rear a depending flange $d'$, which engages the hub $e$ of the tension-collar E, this being sleeved upon the shank of the chuck-body and secured, as will presently appear.

The tension-sleeve E, as stated, is sleeved upon the shank of the chuck-body, its hub $e$ being provided with a longitudinal slit $e'$ to receive one end $f$ of a volute spring F, the other end of which engages a longitudinal notch $d^2$ of the casing D.

The tension-sleeve, as stated, is snugly fitted to the shank A' of the chuck-body and is provided at an accessible point with a threaded opening $e^2$ to receive a locking or set screw E', adapted to lock the tension-sleeve upon the shank of the chuck at any point determined by the desired tension of the spring, it being understood that by shifting this tension-sleeve in one direction or the other and locking it by means of the screw E' the degree of gripping force exerted by the jaws B may be regulated to a nicety for different tools or different work.

The face-plate C is provided at suitable points with bearing-apertures $c^2$, which register with the bearing-grooves $a$ of the chuck-head $A^2$, the journals $b$ of the jaws being thus provided with a bearing throughout their length and the engagement of the projecting or extended ends of the bearing with the bearing-apertures $a^2$ and $c^2$ in the head and face plate preventing all liability of the accidental displacement of the jaws.

From the foregoing it will be seen that the chuck is entirely free from any exterior projections or recesses that might tend to injure a workman when grasping it during rapid movement to remove a tool, the shell and tension-sleeve being, however, preferably knurled, as shown, to afford a firmer grip in rotating these parts to set a tool or to change the tension of a spring.

The chuck possesses great strength within small compass and has a working capacity of wide limits in grasping tools of various sizes. Moreover, there is but little liability of its becoming disabled in use, as the only breakable part is the tension-spring, and this could be replaced quickly by the loosening of the set-screw E and removal of the tension-sleeve and shell, and it will be noted that it is operated without the use of keys or wrenches.

Having thus described my invention, what I claim as new, and desire to secure by Letters Patent of the United States, is—

1. A chuck comprising a body, gripping-jaws pivoted within the body, an inclosing shell upon the body and engaging lugs on said jaws, a tension-sleeve circumferentially adjustable on the shank of the head, and a volute spring secured at one end to the shell and at the other end to the tension-sleeve.

2. A chuck comprising a body having a shank and an open head, the wall of which has symmetrically-spaced bearing-grooves terminating at the inner end in circular bearing-apertures and intersected by openings having outwardly-diverging walls, an annular face-plate secured to the open end of the head, said plate having bearing-apertures registering with the grooves of the head, gripping-jaws journaled in the bearing-groove of the head and in the bearing-apertures of the head and face-plate, said jaws having lugs which project through the openings intersecting the bearing-grooves, an inclosing shell having grooves to engage the lugs of the gripping-jaws, and a spring connected at one end to the shell and at the other end to the chuck-body.

In testimony whereof I have signed my name to this specification in the presence of two subscribing witnesses.

WILLIAM BORCHERT.

Witnesses:
FRED GROT,
L. R. MUDD.